No. 758,370. PATENTED APR. 26, 1904.
J. L. LEE.
CATCH OR CLUTCH FOR PRINTERS' PLATES.
APPLICATION FILED DEC. 18, 1902.
NO MODEL.
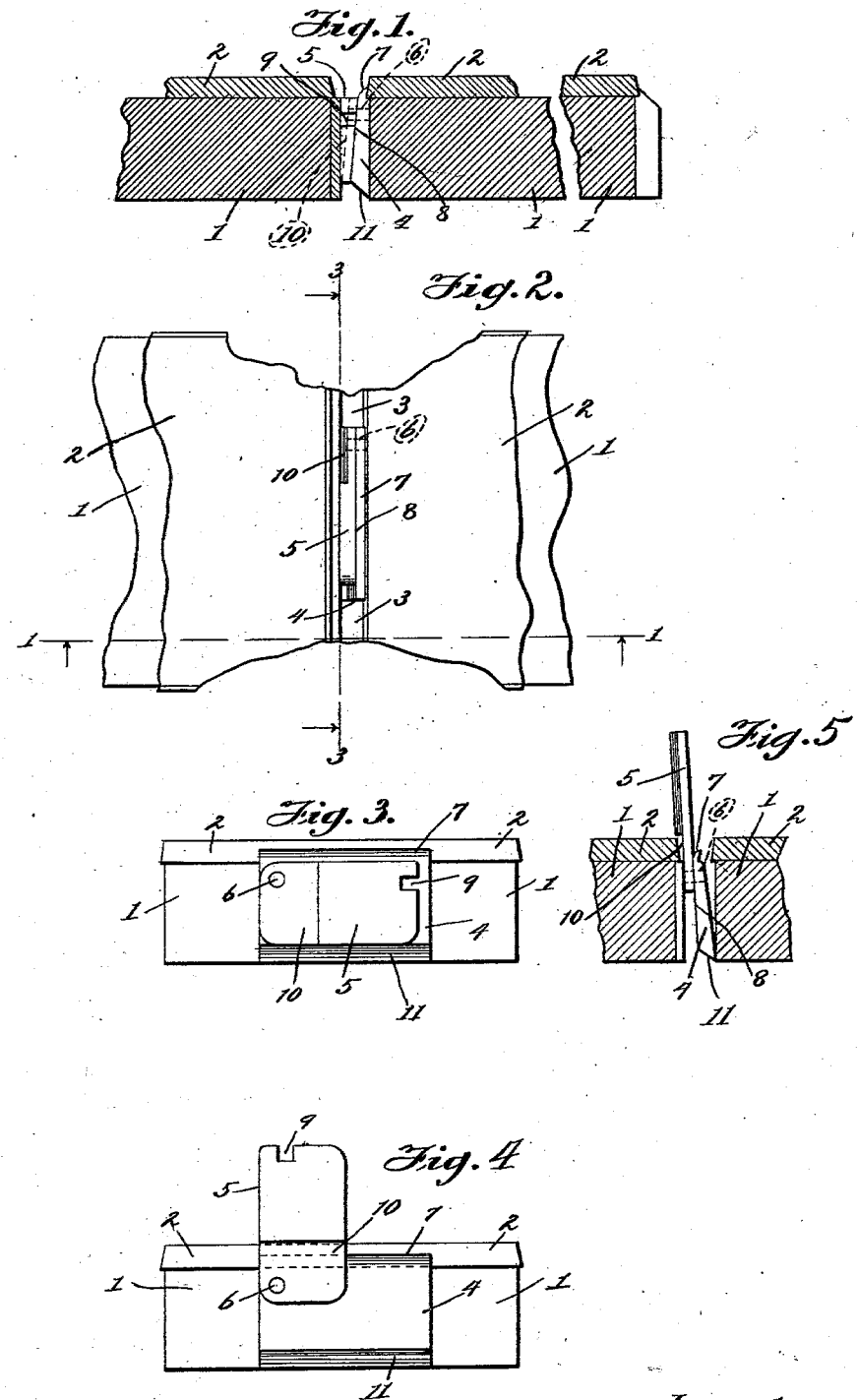

No. 758,370. Patented April 26, 1904.

UNITED STATES PATENT OFFICE.

JAMES L. LEE, OF CHICAGO, ILLINOIS, ASSIGNOR TO THE CHALLENGE MACHINERY CO., OF CHICAGO, ILLINOIS, A CORPORATION OF ILLINOIS.

CATCH OR CLUTCH FOR PRINTERS' PLATES.

SPECIFICATION forming part of Letters Patent No. 758,370, dated April 26, 1904.

Application filed December 18, 1902. Serial No. 135,808. (No model.)

*To all whom it may concern:*

Be it known that I, JAMES L. LEE, a citizen of the United States, residing at Chicago, in the county of Cook and State of Illinois, have invented certain new and useful Improvements in Catches or Clutches for Printers' Plates, of which the following is a full, clear, and exact specification.

My invention relates to that class of catches or clutches usually employed at the edges of stereotype and other printers' plates for holding the same firmly in position on the base-blocks; and it has for its primary object to provide an improved and simple form of catch or clutch which is capable of being readily wedged in place at the end of the block or base, a further object being to make the clutch or catch of such construction that when it is desired to release the plate the object may be accomplished by loosening the clutch or catch without entirely removing it and when loosened will automatically lean away from the edge of the plate to permit the plate to be removed without requiring any attention on the part of the printer for holding it in its released position.

With these ends in view the invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a vertical sectional view of two base-blocks and the printers' plates thereon, showing my improved clutch arranged between the blocks and locking one of the plates in place. Fig. 2 is a plan view thereof, partially broken away. Fig. 3 is a side elevation viewing the clutch and one of the blocks from the line 3-3, Fig. 2. Fig. 4 is a similar view with the pivoted member of the clutch elevated, and Fig. 5 is a view similar to Fig. 1 with such pivoted member elevated.

1 is a base-block usually employed for supporting the printer's plate 2 and holding the same type-high and which plate is ordinarily provided with beveled edges, which have heretofore been engaged by hooks or catches wedged between two of the blocks 1, slugs 3 of the same or substantially the same width as said hooks or catches being interposed between the blocks at both ends of each hook or catch to form an appropriate space for the insertion of the hook or catch.

In carrying out my invention the catch or clutch is inserted at the same places; but it is formed of two members 4 5, pivoted together at one end by means of pivot 6. The outer faces of these members 4 5 are parallel and equal in width or substantially equal in width to the space between the blocks 1 when separated by the slugs 3, so that when the clutch is inserted in this space it will snugly fit the same, and its hook 7 will engage the edge of plate 2 and hold the latter in place; but the meeting faces of the members 4 5 are beveled, as shown at 8, with the wider edge of the member 5 at the top, and the member 5 is provided at its end opposite the pivot 6 with a notch or shoulder 9, whereby this end may be pulled upwardly, as shown in Fig. 3, by means of any suitable hook or other implement engaging under shoulder 9, and owing to the narrower part of member 5 being at the bottom it will be seen that when thus turned upwardly the total width of the clutch will be reduced and its grip between the blocks 1 consequently released, the pivot 6 being located at the upper corner of the member 5 and the member 5 being reduced in width at said corner to the same width as its lower edge, as shown at 10, so that when turned upwardly the reduced portion will be above the upper edge of the block 1, and the width of the clutch between the blocks being thereby reduced the clutch will be free to tilt backwardly or away from that one of the plates 2, which was formerly engaged by its hook 7.

In order that the clutch or catch may thus lean away from the plate automatically when the member 5 is turned upwardly, and thus avoid the necessity of being held out of engagement by the printer, the lower edge of the member 4 is beveled, as shown at 11, in such a way that the deepest part of the clutch will be adjacent to the plate which is being held thereby, and consequently when the member 5 is elevated the preponderance of weight caused thereby on the outer side of member 4 will cause the entire clutch or catch to lean away from its plate.

There are many obvious advantages of a catch or clutch thus constructed, principal among which are the ability to place the hook in position at the edges of any of the plates without unlocking the form, the facility with which the hooks may be released without unlocking the form for removing one or more of the plates, the avoidance of the use of ratchets, which are liable to slip and mar the printing-surfaces of the plates, the avoidance of the use of the grooves between the plates, necessary where screw-hooks requiring ratchet bars or racks are employed.

Having thus described my invention, what I claim as new therein, and desire to secure by Letters Patent, is—

1. In a catch or clutch for printers' plates the combination of two relatively movable members one of which is provided with a hook for engaging the edge of a printer's plate, fitted together and having their outer faces which are perpendicular to the type-surface parallel but their contiguous faces between said parallel faces formed on an angle to said parallel faces whereby their relative movement will cause them to wedge between printers' blocks, substantially as set forth.

2. In a catch or clutch for printers' plates the combination of two relatively movable members pivoted together one of which is provided with a hook for engaging the edge of a printer's plate, the outer faces of said members being parallel but their inner faces formed at an angle to said parallel faces, substantially as set forth.

3. In a catch or clutch for printers' plates the combination of two relatively movable members one of which is provided with a hook for engaging the edge of a printer's plate, the outer faces of said members being parallel but their contiguous faces formed at an angle to said outer faces, the other one of said members having its end reduced in thickness from its upper edge downwardly, substantially as set forth.

4. A catch or clutch for printers' plates comprising two relatively movable members one of which is provided with a hook for engaging the edge of a printer's plate, the outer faces of said members being parallel but their contiguous faces formed at an angle to said parallel faces and a pivot connecting said members together at the upper edge thereof, substantially as set forth.

5. A catch or clutch for printers' plates comprising two relatively movable members one of which is provided at its upper edge with a hook for engaging a printer's plate and at its lower edge on the same side with a downwardly-projecting portion whereby said member will tend to lean away from the direction in which said hook faces, the outer faces of said members being parallel but their inner faces formed at an angle to said outer faces and a pivot connecting said members together, substantially as set forth.

JAMES L. LEE.

Witnesses:
F. A. HOPKINS,
M. B. ALLSTADT.